US010838709B2

(12) United States Patent
Eapen et al.

(10) Patent No.: US 10,838,709 B2
(45) Date of Patent: *Nov. 17, 2020

(54) FAULT RESISTANT 24×7 TOPOLOGY FOR BUSINESS PROCESS MANAGEMENT ECOSYSTEM

(71) Applicant: Morgan Stanley Services Group Inc., New York, NY (US)

(72) Inventors: Sujit Eapen, Princeton, NJ (US); Sonil Trivedi, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,005

(22) Filed: Jul. 18, 2019

(65) Prior Publication Data

US 2020/0026508 A1    Jan. 23, 2020

Related U.S. Application Data

(63) Continuation of application No. 16/037,176, filed on Jul. 17, 2018, now Pat. No. 10,402,191.

(51) Int. Cl.
*G06F 8/65* (2018.01)
*H04L 12/24* (2006.01)
(Continued)

(52) U.S. Cl.
CPC .................. *G06F 8/65* (2013.01); *G06F 8/71* (2013.01); *G06F 9/44536* (2013.01);
(Continued)

(58) Field of Classification Search
USPC ......................................................... 717/170
See application file for complete search history.

(56) References Cited

U.S. PATENT DOCUMENTS 7,089,566 B1 * 8/2006 Johnson .................. G06F 9/541
                                                                    707/E17.005
7,599,947 B1 * 10/2009 Tolbert .................... G06F 16/86
(Continued)

OTHER PUBLICATIONS

Kenneth Choi; "Stateful and Stateless Authentication"; Medium. com website [full url in ref.]; May 14, 2018 (Year: 2018).*
(Continued)

*Primary Examiner* — Wei Y Zhen
*Assistant Examiner* — Clint Thatcher
(74) *Attorney, Agent, or Firm* — Weitzman Law Offices, LLC (57) ABSTRACT

A system and computer-implemented method for providing a load-balanced server architecture to end users and allowing software on the server architecture to be updated without downtime during a transition to the new software version. Run-time errors due to incompatibilities between datatypes, interfaces, deserialization methods, and classes loaded by class loaders in object oriented server software may be avoided by using the system to track a software version used in association with a particular task. By routing requests related to a particular task to a particular server running the same software version, compatibility is maintained and efforts to migrate data across software servers or add code to handle cross-version compatibility are unnecessary.

20 Claims, 5 Drawing Sheets

(51) Int. Cl.
*H04L 29/06* (2006.01)
*H04L 29/08* (2006.01)
*G06F 16/951* (2019.01)
*G06F 9/445* (2018.01)
*G06F 8/71* (2018.01)

(52) U.S. Cl.
CPC ............ *G06F 16/951* (2019.01); *H04L 41/12* (2013.01); *H04L 41/20* (2013.01); *H04L 67/34* (2013.01); *H04L 67/42* (2013.01)

(56) References Cited

U.S. PATENT DOCUMENTS

| | | |
|---|---|---|
| 9,547,564 B1 | 1/2017 | Troutman et al. |
| 2009/0106571 A1 | 4/2009 | Low et al. |
| 2013/0282746 A1 | 10/2013 | Balko et al. |
| 2014/0304409 A1 | 10/2014 | Kamath et al. |
| 2016/0139910 A1 | 5/2016 | Ramanathan et al. |
| 2018/0288138 A1 | 10/2018 | Venkiteswaran et al. |
| 2018/0336022 A1 | 11/2018 | Eberlein et al. |
| 2019/0007311 A1 | 1/2019 | Omar |
| 2019/0034285 A1 | 1/2019 | Knechtel et al. |
| 2019/0065165 A1 | 2/2019 | Troutman et al. |
| 2019/0065275 A1 | 2/2019 | Wong et al. |

OTHER PUBLICATIONS

"Getting Started With Process Federation Server"; https://www.ibm.com/support/knowledgecenter/SSFTN5_8.5.6/com.ibm.wbpm.main.doc/topics/cbpm_fps.html; Mar. 15, 2015.

"Using Sessions and Session Persistence"; http://docs.oracle.com/cd/E13222_01/wls/docs100/webapp/sessions.html; Oct. 5, 2015.

Rouse, Margaret; "What is Blue/Green Deployment?"; https://searchitoperations.techtarget.com/definition/blue-green-deployment; Aug. 10, 2016.

* cited by examiner

FAULT RESISTANT 24×7 TOPOLOGY FOR BUSINESS PROCESS MANAGEMENT ECOSYSTEM

CROSS REFERENCE TO RELATED APPLICATIONS

This application is a continuation of co-pending U.S. patent application Ser. No. 16/037,176, filed Jul. 17, 2018, and entitled "FAULT RESISTANT 24×7 TOPOLOGY FOR BUSINESS PROCESS MANAGEMENT ECOSYSTEM", which is hereby incorporated by reference in its entirety.

FIELD OF INVENTION

This disclosure relates to systems and methods for improved network and server cluster topologies, and more specifically, to systems and methods for more efficiently implementing software upgrades without system downtime or errors stemming from incompatibility in software versions through use of a blue-green system topology on the server side of a server-client system.

BACKGROUND

In software development, blue-green topologies are used to smoothly transition between a first software version and a second software version. A system may run, in parallel, two servers or server clusters, one of which is denoted "blue" and actively runs an already released and stable version of software, and the other of which is denoted "green" and runs a test or development version of the software. A router or load balancer may direct all incoming end user requests to the blue system, and all developer or tester requests to the green system. When the new version of the software on the green system is ready, any databases on the blue system may be cloned to the green system, and the router may begin to direct all traffic to the green system. Accordingly, there is no downtime, as the blue system is not taken down for maintenance until the green system's functioning is confirmed. If bugs are detected with the green release, the router may be used to again seamlessly transition back to the blue system while the green system undergoes further development.

In many fields, business process management (BPM) software is used to track a number of parameters related to a task or project as it goes through stages or iterations towards completion. For example, BPM software may be used to track the confirmation of a bug report and fixing of the bug in software development, to track the status of an automobile at a mechanic through various procedures or checkups, to track the completion of a service request made to a customer service department, to track the conversion of a sales lead into an active customer by a sales team, etc.

Application of existing blue-green transition methods to transfer to a new version of BPM software will typically lead to a variety of errors related to version incompatibilities, changes in data structures, changes in application programming interfaces (APIs), and artifacts of data serialization and deserialization, rendering the software incapable of being used to complete already-begun tasks.

SUMMARY

In accordance with one aspect of this disclosure, a system is disclosed for providing software services, comprising a first software server (or module) of a plurality of software servers (or modules), a second software server (or module) of the plurality of software servers (or modules), a database, and a gateway router. The first software server uses a first software version to operate upon software sessions generated by the first software version, and the second software server uses a second software version to operate upon software sessions generated by the second software version. The database stores a plurality of records, each record of the plurality of records comprising a reference to a software session and a reference to a software version. The gateway router is configured to receive a request to access a particular software session that has been previously serialized; query the database to determine which software version is associated with the particular software session; determine which software server is executing the software version associated with the particular software session; and forward the request to the software server determined to be executing the software version associated with the particular software session. Responsive to receiving the request forwarded by the gateway router, the software server determined to be executing the software version associated with the particular software session is configured to retrieve a serialized form of the particular software session; deserialize the serialized form; and provide a user interface to perform one or more operations using the particular software session.

In some embodiments, the gateway router is connected to multiple servers running each software version, and the gateway router is configured to select a software server based at least in part on balancing load between two or more software servers, and may lead to selection of a software server hosted on a different physical device from a physical device that hosted a software server that originated the particular software session.

In some embodiments, the gateway router is further configured to receive a request to initiate a new software session and forward the request to the second software server. If a notification is received that a software error has been detected in the second software version, the gateway router is further configured to receive a different request to initiate a new software session and forward the different request to the first software server.

A method for upgrading a server cluster (or other software execution system) from a first software version to a second software version is disclosed. The method comprises receiving all client requests to the server cluster at a gateway router and tracking, in a database connected to the gateway router, a software version used to initiate a software session associated with each client request received by the server cluster. A first mode of operation is entered wherein all newly initiated sessions are handled by a server of the server cluster running the first software version. After one or more sessions have been initiated, the server cluster transitions from the first mode of operation to a second mode of operation wherein all newly initiated sessions are handled by a server of the server cluster running the second software version, wherein all client requests related to modifying an existing session are forwarded to a server of the server cluster running a same software version as a server of the server cluster used to initiate the existing session, and wherein the gateway router forwards client requests related to modifying an existing session based on querying the database to determine the software version used to initiate the existing session. Responsive to receiving a notification that an error exists in the second software version, the server cluster may transition from the second mode of operation to a third mode of operation wherein all newly initiated sessions are handled by a server of the server cluster running the first software version, wherein all client requests related to modifying an existing session are forwarded to a server of the server cluster running a same software version as a server of the server cluster used to initiate the existing session, and wherein the gateway router forwards client requests related to modifying an existing session based on querying the database to determine the software version used to initiate the existing session.

A method is disclosed for providing software services, comprising operating a first software server using a first software version to operate upon software sessions generated by the first software version and operating a second software server using a second software version to operate upon software sessions generated by the second software version. The method next involves receiving, at a gateway router, a request to access a particular software session that has been previously serialized; querying a database that stores a plurality of records, each record of the plurality of records comprising a reference to a software session and a reference to a software version, to determine which software version is associated with the particular software session; determining which software server is executing the software version associated with the particular software session; and forwarding the request from the gateway router to the software server determined to be executing the software version associated with the particular software session. Finally, the method involves retrieving, by the software server, a serialized form of the particular software session; deserializing the serialized form; and providing a user interface to perform one or more operations using the particular software session.

DETAILED DESCRIPTION

The lack of adequate methods for handling incompatibility between software versions in BPM software, highlighted above, may be addressed by creating a system for tracking the status of a plurality of tasks in a business process management system and routing requests/commands related to a particular task to a particular server in order to ensure that incompatibilities do not cause an error across a software interface or while retrieving data from a database.

Figure 1:
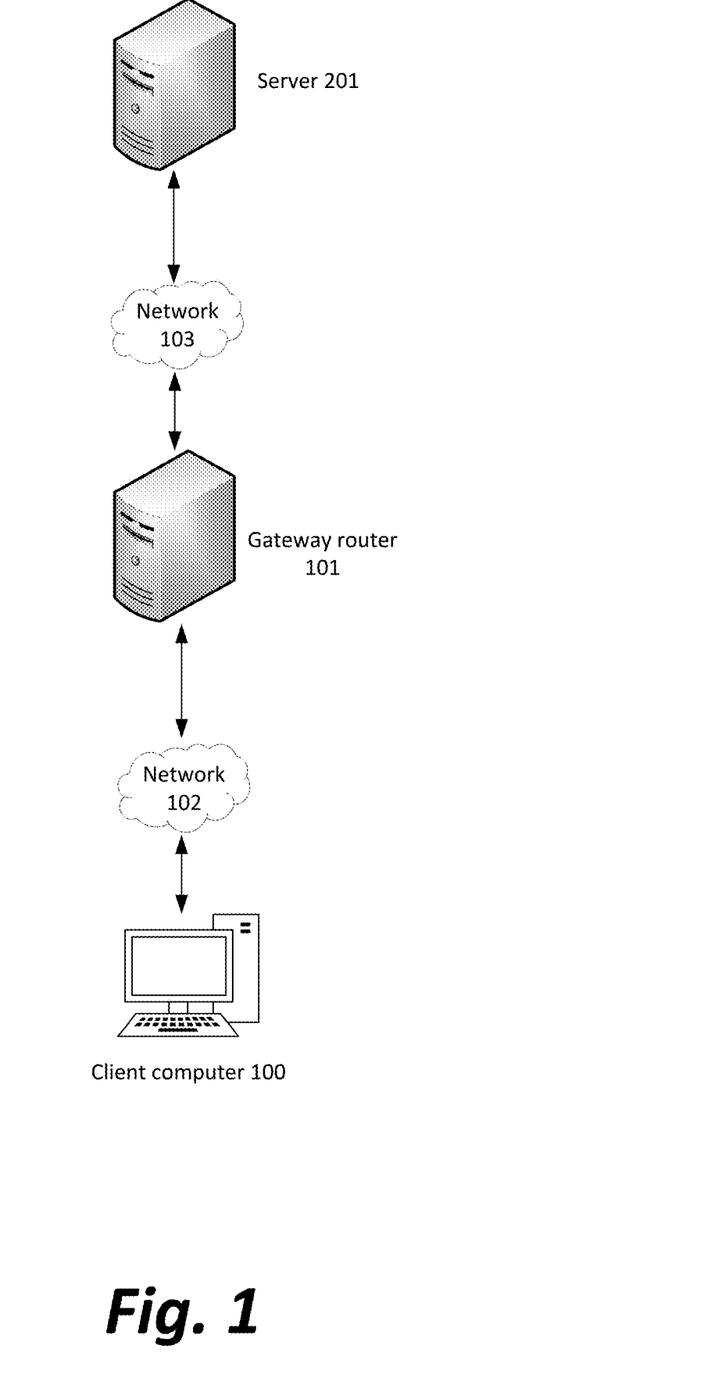
FIG. 1 illustrates, in simplified form, a system of computing devices used for business process management from the point of view of a client computing device of the system.

With reference now to FIG. 1, a user interface on a client computer 100 may be used by a human user to operate a workflow user interface and request information related to a pre-existing task in the BPM software.

In some embodiments, client computer 100 may connect to a gateway router 101 directly, or via a company ethernet or wireless network 102. In other embodiments, the network 102 between client computer 100 and gateway router 101 may involve some number of intermediate routers, such as the connection between a client computer in one office using a virtual private network to access devices in another office, or a client computer using the Internet generally to access a particular gateway router 101.

From the point of view of the user and the user's computer on the network, the topology of the network 103 behind the router 101 is unknown and can be changed at any time without the user interface being affected. So long as a structured interface—including, for example, a Simple Object Access Protocol (SOAP) API or Representational State Transfer (REST) API—has been established for communication with the underlying server software running on some server 201, the gateway router 101 may have any server architecture behind it and the client computer can be agnostic to, for example, which server 201 it is ultimately being served by or what version of particular software is running on that server.

Figure 2:
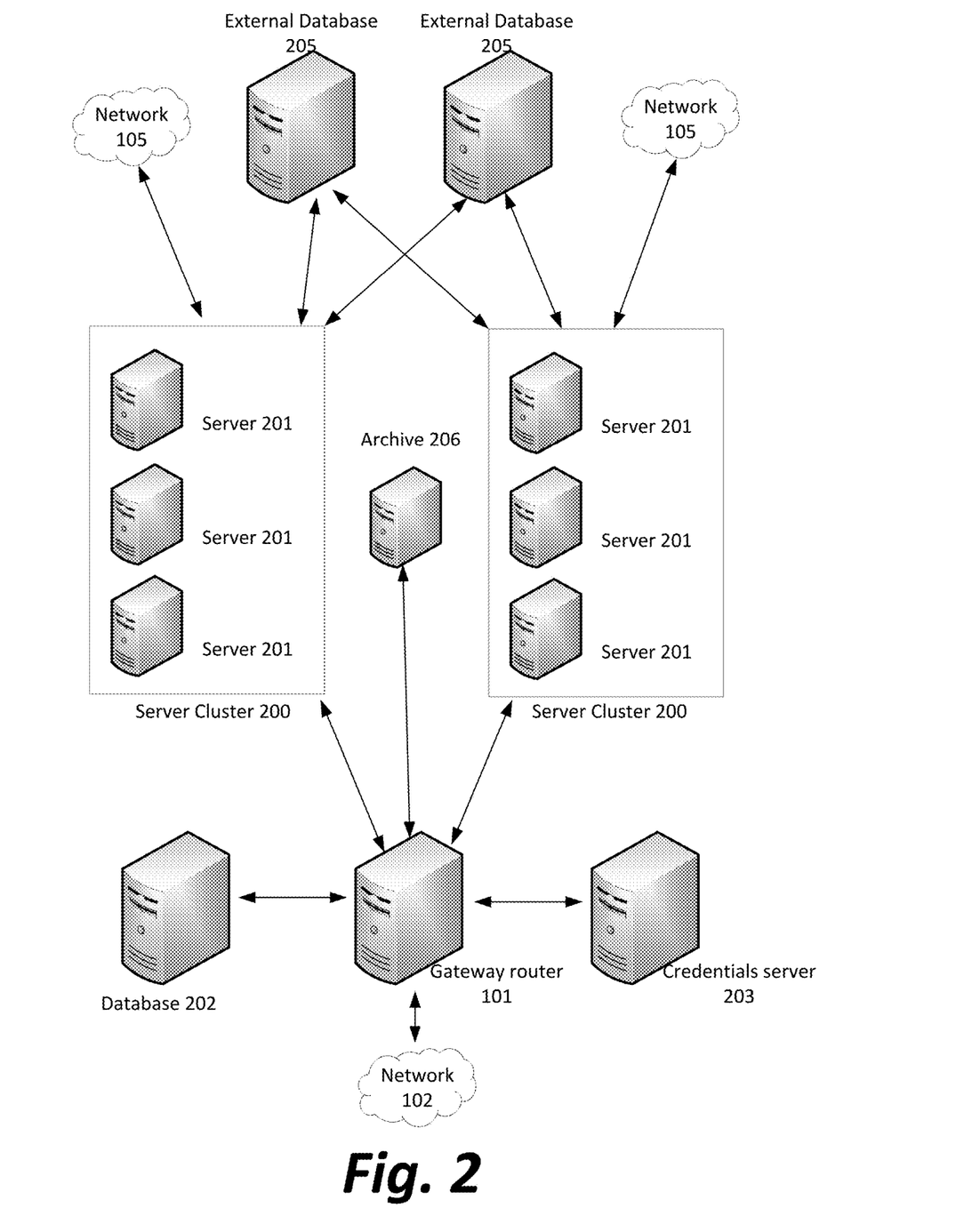
FIG. 2 illustrates, in simplified form, the backend of a server network to be used for providing business process management services according to methods described herein.

FIG. 2 illustrates, in simplified form, the backend of a server network to be used for providing business process management services according to methods described herein.

The gateway router 101 may be connected to a plurality of server clusters 200, each server cluster comprising a one or more software servers 201. Each software server in a given cluster may be running a same version of server software for BPM, and each cluster may have servers running a different version of the BPM server software from other clusters' servers. In an exemplary embodiment, the server software may be Process Federation Server™, produced by the International Business Machines Corporation.

The gateway router 101 may also be connected to a database 202. The database may store a plurality of records associating BPM tasks with the versions of the BPM software in which they were initiated. By querying the database 202 based on an incoming request to access an already existing task, the gateway server 101 may determine which cluster or server is running appropriate software to continue modifying the BPM task. Although a preferred embodiment might use, for example, a structured query language (SQL) based database, any data structure for associating data may be used, such as NOSQL systems, comma-separated value files, or other data types suitable for logging. Database 202 may, in alternative embodiments, be stored on a same physical device as the gateway router 101, and if hosted on a separate computing device, need not be on the opposite side of the gateway router 101 from the client computing device 100.

The gateway router 101 may also be connected to a credentials server 203. In some embodiments, the credentials server 203 may be, for example, a server for the Kerberos security protocol. In other embodiments, the server may facilitate a form of single-sign-on security system such that the same credentials used to access the user interface on client computer 100 are incorporated into a client request received at gateway router 101. Credentials server 203 may, in alternative embodiments, be operated as a running application on a same physical device as the gateway router 101, and if a separate computing device, need not be on the opposite side of the gateway router 101 from the client computing device 100 (though it may be preferable for security or other reasons).

The gateway router 101 may use the credentials server 203 to determine whether an incoming request to initiate or modify a task in the BPM system is made by a user authorized to access the system, or to access the particular task. For example, a particular task type may be initializable by any customer service representative at a company, but the ability to modify certain data fields or to close the task as completed may be held only by certain higher-tier representatives or managers.

One or more additional databases 204 may be accessed by the servers 201. In some embodiments, every server 201 may have access to every database 204, while in other embodiments, the databases 204 may be connected to or accessible only by a particular cluster or by a particular server. These databases may be used to store, for example, information related to users, other assets or information related to accounts, and most importantly, serialized persistent software sessions in the BPM system.

These serialized persistent software sessions may store, for example, all information related to the current task state and history, such as which representatives have initialized or acted on a task, the nature of those actions, any data fields entered by the representatives, timestamps of these actions, a version history of any changed data fields, etc.

Because of the complexity of the data associated with a particular task in the BPM software, it is preferable (and a default behavior of most BPM software) to store the task as a single software object that can be serialized for storage between sessions when a user or system is accessing the object, and deserialized when it needs to be modified, instead of as a series of records in different database tables, each of which is associated with a key ID. However, because objects in most object oriented systems are loaded by a classloader that expects a deserialized object not only to have a particular class type, but to have been created by a particular version of the class, care is needed to avoid runtime errors and software crashes.

For example, in a software system using a Java virtual machine's classloader, each use of a given class name must be unique. As a result, if a classloader has already loaded a Task class from version 2.0 and attempts to deserialize a Task object created in version 1.0 of the software and cast the deserialized object to type Task, the software will necessarily throw an exception and fail because a unique identifier associated with the version 1.0 Task does not match the expected unique identifier of the version 2.0 Task, and a runtime exception is thrown rather than assume that the Task types must be interchangeable. To have code that will both properly compile and work at runtime, it is necessary to write additional functions to convert between each pair of software versions, leading to a quadratic increase in time spent working towards interoperability as the number of versions of software supported increase.

The server clusters 200 may have connections to one or more external computing systems via network(s) 205, such as notifying third party systems that a task has been initiated, modified, or completed, or pulling data from a third-party database.

The system may also comprise an archival server 206 used to store information related to completed tasks. When a task is completed, the object representing it may be converted to a read-only mode or format, since no further action is expected to be taken. The read-only mode may have a standardized format across software versions, or may have different formats for different software versions. For example, instead of a serialized form of a software object, the object may be converted into a single text string that is searchable within a database, or stored as one or more records in a database table such that data fields of the object are stored in a column of the record, or in some other form that is version-agnostic compared to a serialized object generated within a particular version of some software.

Figure 3:
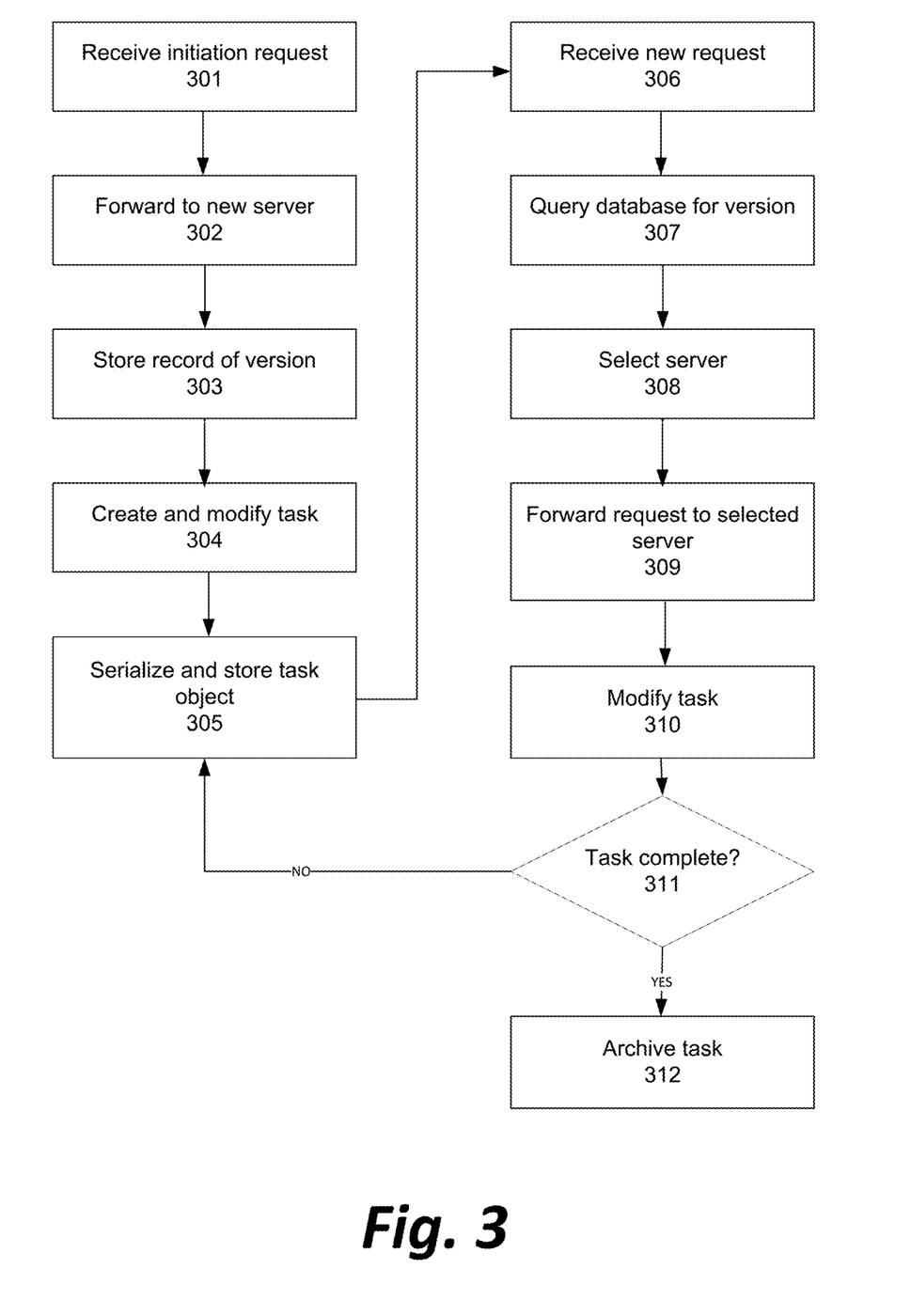
FIG. 3 illustrates, in simplified form, a flowchart of a method for creating and proceeding through a task in a business process management system.

FIG. 3 illustrates, in simplified form, a flowchart of a method for creating and proceeding through a task in a business process management system.

A user may use, for example, a webpage user interface to generate a Hypertext Transfer Protocol (HTTP) message according to a REST API to request initiation of a new task in the BPM software (Step 301). Client software may, in other embodiments, be a mobile device app, a native desktop app, an applet or servlet embedded in a page, a plugin in an email client or other messaging software, or some other form of software with a user interface.

Upon receiving the request, the request is forwarded by the gateway router 101 to a server or server cluster using the most recent software version or most recent stable software version (Step 302). At this time, the gateway router may also store, in database 202, the record of that new task and the associated software version (Step 303).

The initial task is created and any additional modifications to the task requested by the user are effected by the server (Step 304) and the user of the client computing device is able to exit the user interface. The software object representing the task in the BPM software may be serialized and stored in either database 202 or other database 204 (Step 305).

When the user seeks to perform more work on the task, a second request is generated by the user interface on client computer 100 and transmitted to the gateway router 101 (Step 306). Upon receipt of the request, the gateway router 101 may query the database 202 to determine what software version was used to create the task (Step 307).

After having determined the software version used, the gateway router may select a server 201 from among all servers that are running the determined software version (Step 308). The selection may be made based on load balancing concerns to avoid any single server of a cluster being over- or under-utilized, and thus may mean that a different server 201 acts on the subsequent request than the server used to initiate the task. In an alternative embodiment, the gateway router 101 may ensure that the same server used to initiate the task is used for the lifetime of the task, so long as the server is available.

The request is forwarded to the determined server (Step 309), the software object representing the task is retrieved from the database storing the serialized task, deserialized, and modified (Step 310).

If a task has been definitively completed (Step 311), it will not undergo any state changes and may be shifted into a read-only mode. The record associated with the task may be removed from the BPM system and stored in archival database 206 or otherwise be marked as read-only.

Otherwise, the task object is reserialized and stored for future actions (Step 305) and a cycle of retrieval and modification until the task is completed (Steps 306-311).

As a more concrete example of task creation and progress through the system, a customer service system may be meant to track receipt and entry of customer requests to update notes about the customer (for example, updating a customer's contact information and bank account details).

The task may first be initiated by a representative who actually receives a call, email, or other communication from the customer. The representative may be authorized to initiate tasks within the system, but not to take any additional actions beyond initiating the task and recording information related to the customer's intent so that another representative can satisfy that intent. The additional information related to the customer's intent may be stored in the Task object as additional data fields before the object is serialized and stored. The user interface generated for the representative at this stage may include commands to cancel the initiation or to modify the data stored within the Task object, but not to change data in any permanent databases regarding customer information.

Rules regarding which representatives have authorization to advance or approve certain actions may be stored in, for example, a BPMN (Business Process Model & Notation) standard that is compatible with and applied by one or more BPM software systems. The user interface may allow display of the logical connections in the BPMN for the given task to the representative in order to make the representative aware of any checklist of required subtasks or steps for which the representative is responsible. Some aspects of the task flow may be automatically enforced by the system rather than relying on a human user, such as data validation to ensure that a valid number has been entered as a customer's ZIP code or bank account number. If a representative is not authorized to continue working on a task to a next step, the visual interface may notify the representative of that fact and inform the representative of who should be notified to pick up the unfinished task and complete it.

Another representative of higher authority may log into the system and see a list of initiated but unclaimed tasks, and may have the authority to claim the task of updating the customer's contact information and bank account details. Upon claiming the task, the server will deserialize the stored Task object and present all information related to the task to the representative. The representative is authorized to actually change the permanent database entries for the customer and then confirm within the user interface of the BPM system that the changes have been made, an option that was missing for the previous representative. The Task object may be marked as completed but still awaiting a final review, fraud check, or quality assurance check, and reserialized.

A third representative may log into the system and see completed tasks that are awaiting final approval or quality assurance, and open the task (by again retrieving and deserializing the Task object) to confirm that it was properly filled out, and confirm within the user interface of the BPM system that the changes have been approved/double-checked. Upon this final confirmation, the task may be removed from the system and stored in an archival form to assist in record-keeping or auditing, but read-only and only reversible through a new task. The archival form may simply list the IDs of representatives who worked on the task and the timestamps of their actions without storing other data fields associated with the object, such as any comments provided by the original customer that are recorded in case they are useful for the task, but not relevant for record keeping or legal compliance.

In each case where the Task object is serialized or deserialized, the same server software version is used, even though days or weeks may pass between the first and second representatives or second and third representatives accessing the task in the BPM system. Thus, even if the default version of the software has been upgraded or downgraded during those periods of time, the Task object will be deserialized without error due to version incompatibility.

Figure 4:
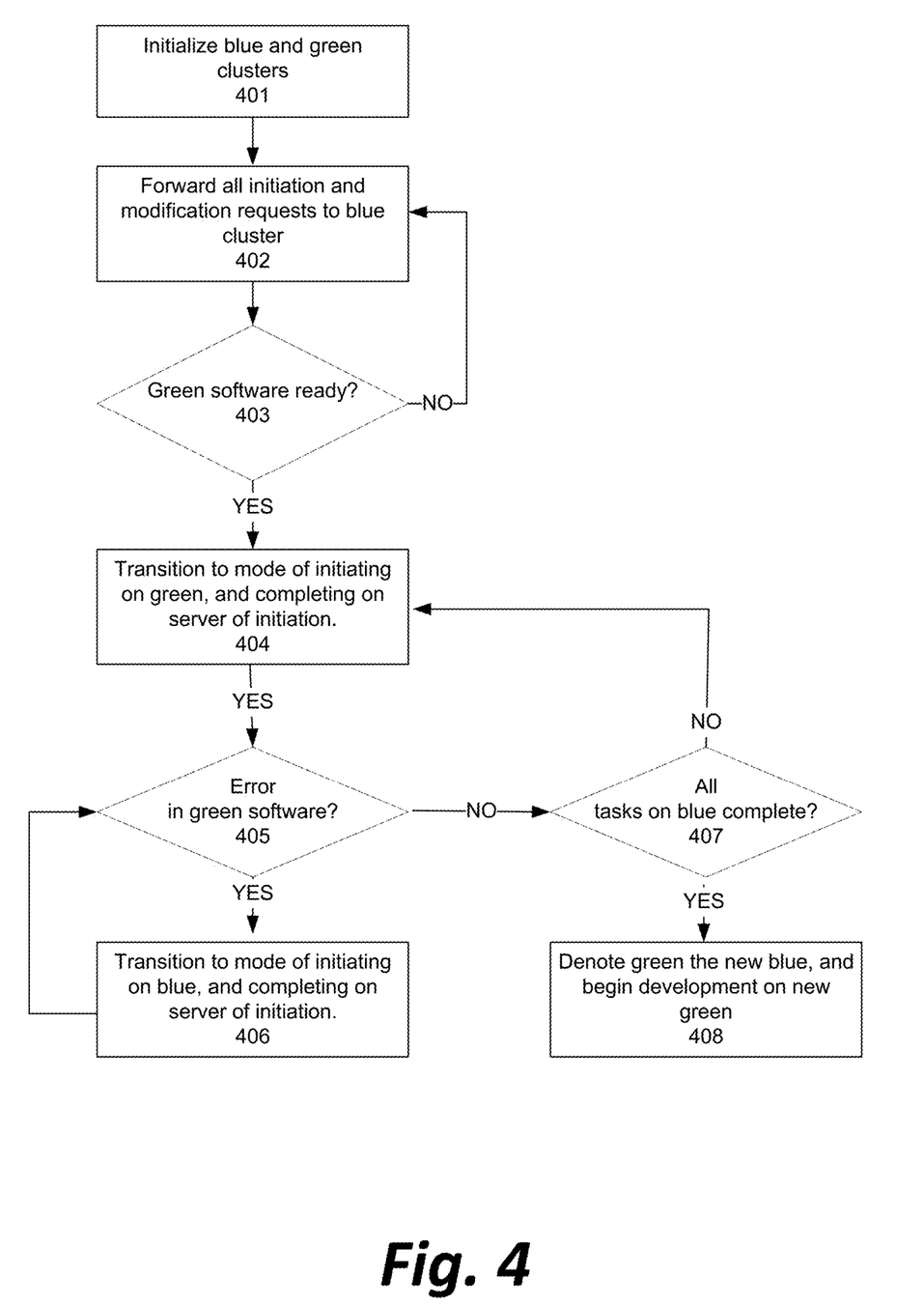
FIG. 4 illustrates, in simplified form, a flowchart of a method for creating and updating a system for routing requests related to a business process management system spanning multiple software versions.

FIG. 4 illustrates, in simplified form, a flowchart of a method for creating and updating a system for routing requests related to a business process management system spanning multiple software versions.

After initialization, the "blue" server or server cluster may be supplying services exclusively in version 1.0 of the software (numbering is provided by way of example only) and waiting for client connections (Step 401). At this time, development of version 2.0 of the software may be occurring on the "green" server of server cluster.

If a client makes a request to initiate a new task or continue work on an already begun task (Step 402), the message may be received by gateway router 101 and forwarded to one of the blue servers, as the software on the green servers is considered unready for release to users of the software.

Once development of version 2.0 is completed on the green server cluster (Step 403), the gateway router 101 may be reconfigured to send all new requests to initiate a new task to a green server (Step 404). Requests to continue work on an already begun task will be routed either to a blue server running version 1.0 or to a green server running version 2.0, based on the version used when initiating the already begun task.

If an error is found in version 2.0 of the software (Step 405) (or, for example, if any other development or maintenance needs to be performed that makes unnecessary use of the green server cluster undesirable), the gateway router's configuration may be modified back to send all new requests to a blue server (Step 406). However, because some tasks were initiated on a green server in version 2.0, those tasks may still be sent to a green server upon the gateway router 101 determining that one of the green servers was used to initiate the task. Optionally, tasks initiated on the green system may be migrated to the blue system if the software error is catastrophic, but the labor needed to write custom software to deserialize such tasks, convert datatypes, and reserialize them in the old software version may be cost-prohibitive, and it may be preferable to attempt to continue using the green system for only those tasks initiated in the green system, while transitioning to performing all new tasks on the blue system.

Eventually, the version 2.0 may prove to be stable and all tasks initiated in version 1.0 may be completed and archived (Step 407). Servers devoted to version 1.0 may be re-denoted the new green, servers devoted to version 2.0 may be denoted the new blue, and software development on version 3.0 may begin on the new green servers (Step 408). As a result, the system is capable of seamlessly transitioning from version 1.0, to 2.0, to 3.0, in either a forward or backward direction as necessary. Furthermore, there is no constraint that only two software versions or server clusters may be active at a given time, and it is possible for an arbitrary number of servers, each running a different software version, to be used. For example, a stable green server cluster and a legacy blue server cluster could be augmented by a third server cluster before all tasks on the legacy blue server cluster have been archived. As a result, the gateway router 101 may be configured to initiate all new tasks on the third cluster, and to forward requests related to the existing tasks to the legacy blue or stable green clusters as appropriate for where the existing task was initiated.

Figure 5:
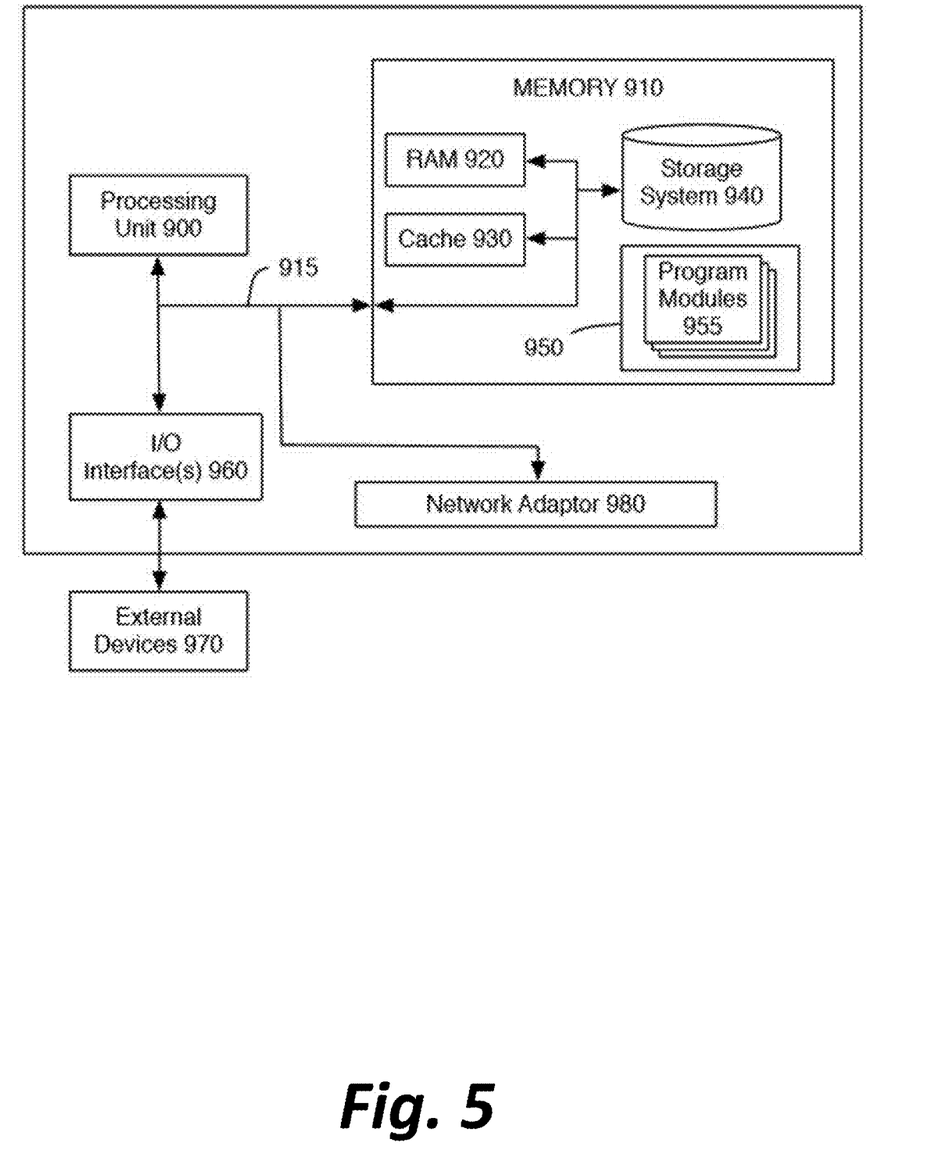
FIG. 5 is a block diagram of a representative computing device that may be utilized to implement various features and processes described herein.

FIG. 5, below, describes various enabling technologies related to the physical components and architectures described above.

FIG. 5 is a high-level block diagram of a representative computing device that may be utilized to implement various features and processes described herein, for example, the functionality of client computing device 100, gateway router 101, databases 202 and 204, servers 201, 203, and 206, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. A system for providing software services, comprising:
   a first software server or software module of a plurality of software servers or software modules, using a first software version to operate upon software sessions generated by the first software version;
   a second software server or software module of the plurality of software servers or software modules, using a second software version to operate upon software sessions generated by the second software version;
   a database storing a plurality of records, each record of the plurality of records comprising a reference to a software session and a reference to a software version, including a particular software session that was initiated by a first user using credentials within a stateless security protocol or a stateful security protocol;
   a gateway router configured to:
      receive a request from the first user or a second user, using credentials within the stateless security protocol or the stateful security protocol, to access the particular software session;
      query the database to determine which software version is associated with the particular software session;
      determine which software server or software module is executing the software version associated with the particular software session; and
      forward the request to the software server or software module determined to be executing the software version associated with the particular software session; and
   wherein, responsive to receiving the request forwarded by the gateway router, the software server or software module determined to be executing the software version associated with the particular software session is configured to:
      retrieve a serialized form of the particular software session;
      deserialize the serialized form; and
      provide a user interface to the first user or to the second user to perform one or more operations using the particular software session.

2. The system of claim 1, wherein two or more software servers or software modules of the plurality of software servers or software modules use the first software version, wherein two or more software servers or software modules of the plurality of software servers or software modules use the second software version, wherein the gateway router selects one software server or software module from two or more software servers or software modules determined to be executing the software version associated with the particular software session, and wherein the gateway router forwards the request to the selected software server or software module of the two or more software servers or software modules determined to be executing the software version associated with the particular software session.

3. The system of claim 2, wherein the gateway router selects the one software server or software module of the two or more software servers or software modules based at least in part on balancing load between the two or more software servers or software modules.

4. The system of claim 1, wherein a physical device that hosted a software server or software module that originated the particular software session and a physical device that hosts the software server or software module determined to be executing the software version associated with the particular software session are two different physical devices.

5. The system of claim 1, wherein the gateway router is further configured to:
   confirm, via connection to a credentials server or module, that the first user or the second user transmitting the request to access the particular software session has permission to access the particular software session.

6. The system of claim 1, wherein the software server or software module determined to be executing the software version associated with the particular software session is further configured to:

receive a request to close a task that the particular software session represents, transform the particular software session into an archival read-only form, and remove a record comprising a reference to the particular software session from the database.

7. The system of claim 6, wherein the software server or software module determined to be executing the software version associated with the particular software session is further configured to:

transmit the archival read-only form to an archive server or module.

8. The system of claim 6, wherein the archival read-only form has a same format whether the particular software session originated in the first software version or the second software version.

9. The system of claim 1, wherein the gateway router is further configured to:

receive a request to initiate a new software session, and forward the request to the second software server or software module.

10. The system of claim 9, wherein the gateway router is further configured to:

receive a notification that a software error has been detected in the second software version, subsequent to the notification, receive a different request to initiate a new software session, and forward the different request to the first software server or software module.

11. A method for upgrading a software execution system from a first software version to a second software version, comprising:

receiving all client requests to the software execution system at a gateway router;

tracking, in a database connected to the gateway router, a software version used to initiate a software session associated with each client request received by the software execution system;

entering a first mode of operation wherein all newly initiated software sessions are handled by a software server or software module of the software execution system running the first software version;

after one or more software sessions have been initiated, transitioning from the first mode of operation to a second mode of operation wherein all newly initiated software sessions are handled by a software server or software module of the software execution system running the second software version, wherein all client requests related to modifying an existing software session are forwarded to a software server or software module of the software execution system running a same software version as a software server or software module of the software execution system used to initiate the existing software session, and wherein the gateway router forwards client requests related to modifying an existing software session based on querying the database to determine the software version used to initiate the existing software session.

12. The method of claim 11, wherein the software execution system comprises more than one software server or software module running the first software version and more than one software server or software module running the second software version, and wherein, during the second mode of operation, a client request related to modifying an existing software session is forwarded to a different software server or software module from the software server or software module of the software execution system used to initiate the existing software session.

13. The method of claim 11, further comprising:

responsive to receiving a notification that an error exists in the second software version, transitioning from the second mode of operation to a third mode of operation wherein all newly initiated software sessions are handled by a software server or software module of the software execution system running the first software version, wherein all client requests related to modifying an existing software session are forwarded to a software server or software module of the software execution system running a same software version as a software server or software module of the software execution system used to initiate the existing software session, and wherein the gateway router forwards client requests related to modifying an existing software session based on querying the database to determine the software version used to initiate the existing software session.

14. A method for providing software services, comprising:

operating a first software server or software module using a first software version to operate upon software sessions generated by the first software version;

operating a second software server or software module using a second software version to operate upon software sessions generated by the second software version;

storing, in a database, a plurality of records, each record of the plurality of records comprising a reference to a software session and a reference to either the first software version or second software version, including a particular software session that was initiated by a first user using credentials within a stateless security protocol or a stateful security protocol and that was subsequently serialized;

receiving, at a gateway router, a request from the first user or a second user, using credentials within the stateless security protocol or the stateful security protocol, to access the particular software session;

querying the database to determine which software version is associated with the particular software session;

determining which software server or software module is executing the software version associated with the particular software session;

forwarding the request from the gateway router to the software server or software module determined to be executing the software version associated with the particular software session;

retrieving, by the software server or software module, a serialized form of the particular software session;

deserializing the serialized form; and providing a user interface to the first user or the second user to perform one or more operations using the particular software session.

15. The method of claim 14, further comprising:

operating a third software server or software module using the first software version;

operating a fourth software server or software module using the second software version; and selecting, by the gateway router, one software server or software module of two or more software servers or software modules determined to be executing the software version associated with the particular software session, wherein the gateway router forwards the request to the selected software server or software module of the two or more software servers or software modules determined to be executing the software version associated with the particular software session.

16. The method of claim 15, wherein the gateway router selects the one software server or software module of the two or more software servers or software modules based at least in part on balancing load between the two or more software servers or software modules.

17. The method of claim 14, wherein the software server or software module determined to be executing the software version associated with the particular software session is hosted on a different physical device from a physical device that hosted a software server or software module that originated the particular software session.

18. The method of claim 14, further comprising:
receiving a request to close a task that the particular software session represents,
transforming the particular software session into an archival read-only form, and
removing a record comprising a reference to the particular software session from the database.

19. The method of claim 18, wherein the archival read-only form has a same format whether the particular software session originated in the first software version or the second software version.

20. The method of claim 14, further comprising:
receiving a request to initiate a new software session;
forwarding the request to the second software server or software module;
subsequent to forwarding the request to the second software server or software module, receiving a notification that a software error has been detected in the second software version;
subsequent to the notification, receiving a different request to initiate a new software session; and
forwarding the different request to the first software server or software module.

* * * * *